United States Patent
Gates et al.

(10) Patent No.: US 9,805,192 B1
(45) Date of Patent: Oct. 31, 2017

(54) SYSTEMS AND METHODS FOR FILE CLASSIFICATION

(71) Applicant: Symantec Corporation, Mountain View, CA (US)

(72) Inventors: Christopher Gates, Culver City, CA (US); Kevin Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 175 days.

(21) Appl. No.: 14/751,178

(22) Filed: Jun. 26, 2015

(51) Int. Cl.
  *G06F 21/00* (2013.01)
  *G06F 21/56* (2013.01)

(52) U.S. Cl.
  CPC ...... *G06F 21/562* (2013.01); *G06F 2221/034* (2013.01)

(58) Field of Classification Search
  CPC .... G06F 21/55; G06F 21/56; H04L 29/06911; H04L 29/06925; H04L 29/06931; H04L 29/06938
  See application file for complete search history.

(56) References Cited

U.S. PATENT DOCUMENTS

| | | | |
|---|---|---|---|
| 8,190,611 B1 | 5/2012 | Nachenberg et al. | |
| 8,341,745 B1* | 12/2012 | Chau | G06F 21/56 709/223 |
| 8,671,449 B1* | 3/2014 | Nachenberg | G06F 21/56 713/187 |
| 2006/0218642 A1 | 9/2006 | Kuppusamy et al. | |
| 2009/0083852 A1 | 3/2009 | Kuo et al. | |
| 2011/0047594 A1 | 2/2011 | Mahaffey et al. | |
| 2012/0090025 A1 | 4/2012 | Milner et al. | |
| 2013/0145471 A1* | 6/2013 | Richard | G06F 21/564 726/24 |
| 2014/0223566 A1* | 8/2014 | Zaitsev | G06F 21/567 726/24 |

OTHER PUBLICATIONS

Acar Tamersoy, et al; Systems and Methods for Detecting Malware Using File Clustering; U.S. Appl. No. 14/273,503, filed May 8, 2014.

(Continued)

*Primary Examiner* — Brandon Hoffman
*Assistant Examiner* — Helai Salehi
(74) *Attorney, Agent, or Firm* — FisherBroyles, LLP (57) ABSTRACT

A computer-implemented method for file classification may include (1) identifying, by a computer security system, a cluster of files that co-occur with each other according to a statistical analysis, (2) identifying ground truth files to which the computer security system has previously assigned a security score, (3) determining that a file in the cluster of files shares an item of file metadata with another file in the ground truth files, (4) assigning a security score to the file in the cluster of files based on a security score of the other file in the ground truth files that shares the item of file metadata, and (5) assigning an overall security score to the entire cluster of files based on the security score assigned to the file in the cluster. Various other methods, systems, and computer-readable media are also disclosed.

20 Claims, 6 Drawing Sheets

(56) References Cited

OTHER PUBLICATIONS

Chau, Duen H., et al., "Polonium: Tera-Scale Graph Mining and Inference for Malware Detection", http://www.cs.cmu.edu/~dchau/polonium_sdm2011.pdf, as accessed Mar. 18, 2014, (2011).

Denis, Frank, "Discovering Malicious Domains Using Co-Occurrences", http://labs.opendns.com/2013/07/24/co-occurrences/?referred=1, as accessed Mar. 18, 2014, OpenDNS Security Labs Blog, (Jul. 24, 2013).

"McAfee Global Threat Intelligence; Comprehensive, cloud-based threat intelligence", http://www.mcafee.com/us/resources/datasheets/ds-global-threat-intelligence.pdf, as accessed Mar. 18, 2014, Data Sheet, McAfee, Inc., (2010).

"McAfee GTI Reputation & Categorization Services", http://www.mcafee.com/us/threat-center/technology/gti-reputation-technologies.aspx, as accessed Mar. 18, 2014, McAfee, Inc., (2003).

"McAfee Global Threat Intelligence File Reputation Service; Best Practices Guide for McAfee VirusScan® Enterprise Software", https://kc.mcafee.com/resources/sites/MCAFEE/content/live/PRODUCT_DOCUMENTATION/24000/PD24043/en_US/48302wp_gti-best-practices_0812_fnl.pdf, as accessed Mar. 18, 2014, McAfee, Inc., (2012).

"FAQs for Global Threat Intelligence File Reputation", https://kc.mcafee.com/corporate/index?page=content&id=KB53735, as accessed Mar. 18, 2014, Knowledge Center, McAfee, Inc., (2003).

Jeffrey S. Wilhelm, et al; Systems and Methods for Anticipating File-Security Queries; U.S. Appl. No. 14/570,518, filed Dec. 15, 2014.

Christopher Gates, et al; Systems and Methods for Curating File Clusters for Security Analyses; U.S. Appl. No. 14/733,983, filed Jun. 9, 2015.

Kevin Roundy, et al; Systems and Methods for Whitelisting File Clusters in Connection with Trusted Software Packages; U.S. Appl. No. 14/737,528, filed Jun. 12, 2015.

Karampatziakis, Nikos et al., "Using File Relationships in Malware Classification", http://link.springer.com/chapter/10.1007/978-3-642-37300-8_1, as accessed May 26, 2015, Using File Relationships in Malware Classification, Detection of Intrusions and Malware, and Vulnerability Assessment Lecture Notes in Computer Science, 9th International Conference, DIMVA 2012, vol. 7591, Springer Berlin Heidelberg, Crete, Greece, (Jul. 26-27, 2012).

Ye, Yanfang et al., "Combining File Content and File Relations for Cloud Based Malware Detection", http://users.cis.fiu.edu/~taoli/pub/p222-malware.pdf, as accessed May 26, 2015, KDD'11, ACM, San Diego, California, (Aug. 21-24, 2011).

"Malheur", http://www.mlsec.org/malheur/, as accessed May 26, 2015, (Jan. 4, 2010).

"Application Whitelisting", https://www.bit9.com/solutions/application-whitelisting/, as accessed Mar. 30, 2015, Bit9, (Apr. 29, 2013).

"McAfee Application Control", www.mcafee.com/us/products/application-control.aspx, as accessed Mar. 30, 2015, (Dec. 12, 2010).

Michael Hart, et al.; A System to identify machines infected by Malware Applying Linguistic Analysis; U.S. Appl. No. 14/226,626, filed Mar. 26, 2014.

* cited by examiner

SYSTEMS AND METHODS FOR FILE CLASSIFICATION

INCORPORATION BY REFERENCE

The following document is incorporated, by reference, in its entirety: U.S. patent application Ser. No. 14/273,503 filed on 8 May 2014 ("SYSTEMS AND METHODS FOR DETECTING MALWARE USING FILE CLUSTERING").

BACKGROUND

Individuals and organizations typically attempt to protect their computing resources with security software products, including antivirus products. To protect the computing resources, the security software products may identify suspicious or unknown files on the protected computing resources and then attempt to identify those files. In the process of identifying the files, the security software products may create a hash of a file and compare the hash to hashes of other known files in a security database. For example, a client-side security product may compare the hash to hashes of files that the client-side security product has previously encountered and identified. Additionally, or alternatively, the client-side security product may compare the hash to hashes of further files that are stored in a server-side security database. Similarly, security software products may analyze the behavior or other attributes of the file in an attempt to estimate whether the file is safe or malicious. Moreover, the vendor of the security software product may also use human experts who manually inspect the file in an attempt to properly classify the file.

The traditional systems for classifying files described above nevertheless suffer from some disadvantages. The large number of suspicious or unknown files may overwhelm the computing and labor resources of the vendor of the security software product. Moreover, attackers may increase the number of suspicious or unknown files by using polymorphism. Accordingly, the instant disclosure identifies and addresses a need for additional and improved systems and methods for file classification.

SUMMARY

As will be described in greater detail below, the instant disclosure generally relates to systems and methods that classify files by, for example, leveraging information from ground truth files to make educated estimates of security scores for other unknown or unclassified files and the corresponding file clusters. In one example, a computer-implemented method for file classification may include (1) identifying, by a computer security system, a cluster of files that co-occur with each other according to a statistical analysis, (2) identifying ground truth files to which the computer security system has previously assigned a security score, (3) determining that a file in the cluster of files shares an item of file metadata with another file in the ground truth files, (4) assigning a security score to the file in the cluster of files based on a security score of the other file in the ground truth files that shares the item of file metadata, and (5) assigning an overall security score to the entire cluster of files based on the security score assigned to the file in the cluster.

In one embodiment, the item of file metadata may include (1) an identity of an author of a digital signature, (2) a file name, and/or (3) a file path. In one embodiment, prior to assigning the security score to the file, the computer security system has not previously assigned a security score to any file in the cluster of files.

In some examples, assigning an overall security score to the entire cluster of files may include giving the file a vote in a vote on the overall security score for the entire cluster of files. In one embodiment, the computer-implemented method may further include checking, prior to determining that the file in the cluster of files shares the item of file metadata with the other file, a field of file metadata that corresponds to the item of file metadata for accuracy in detecting security threats. The method may also include determining that the field of file metadata passes the checking for accuracy. In some examples, checking for accuracy may include checking for a threshold level of false positives and/or a threshold level of false negatives. In one embodiment, the computer-implemented method may further include determining, prior to determining that the file in the cluster of files shares the item of file metadata with the other file, a ranking, in terms of detection accuracy, of a field of file metadata that corresponds to the item of file metadata in comparison to other fields of metadata.

In some examples, assigning the overall security score to the entire cluster of files may include applying a machine learning model. The machine learning module may be generated by inputting to a machine learning algorithm both (1) known security scores from a set of files in the ground truth files and (2) items of file metadata that the set of files shares with another set of files in the ground truth files.

In some examples, assigning the security score to the file in the cluster of files may include identifying files in the ground truth files that share the item of file metadata with the file in the cluster and assigning the security score to the file based on security scores assigned to the files in the ground truth files. In one embodiment, the security score may include a classification as malicious.

In one embodiment, a system for implementing the above-described method may include (1) an identification module, stored in memory, that (A) identifies, by a computer security system, a cluster of files that co-occur with each other according to a statistical analysis and (B) identifies ground truth files to which the computer security system has previously assigned a security score, (2) a determination module, stored in memory, that determines that a file in the cluster of files shares an item of file metadata with another file in the ground truth files, (3) an assignment module, stored in memory, that (A) assigns a security score to the file in the cluster of files based on a security score of the other file in the ground truth files that shares the item of file metadata and (B) assigns an overall security score to the entire cluster of files based on the security score assigned to the file in the cluster, and (4) at least one physical processor configured to execute the identification module, the determination module, and the assignment module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, by a computer security system, a cluster of files that co-occur with each other according to a statistical analysis, (2) identify ground truth files to which the computer security system has previously assigned a security score, (3) determine that a file in the cluster of files shares an item of file metadata with another file in the ground truth files, (4) assign a security score to the file in the cluster of files based on a security score of the other file in the ground truth files that shares the item of file metadata, and (5) assign an overall security score to the entire cluster of files based on the security score assigned to the file in the cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for file classification. As will be explained in greater detail below, the systems and methods described herein may enable security software products to overcome limitations in properly classifying files after the security software products have identified clustering or co-occurring relationships between the files. In other words, a security software product may identify a cluster of co-occurring files. Accordingly, the vendor of the security software product would like to leverage a classification of one of the files to thereby classify the remainder of the files in the cluster, because all the files in the cluster will likely share the same classification. Nevertheless, the vendor of the security software product may be unable to leverage the classification of one of the files if the vendor has not previously encountered or classified a single file within the cluster. Accordingly, the systems and methods described herein may overcome this limitation by further leveraging security scores that the vendor previously assigned to files that (1) are different than the files in the cluster under evaluation but nevertheless (2) share attributes of file metadata with the files in the cluster. Because these different files nevertheless share attributes of file metadata, the security software product may safely estimate that the different files share a common security classification.

Figure 1:
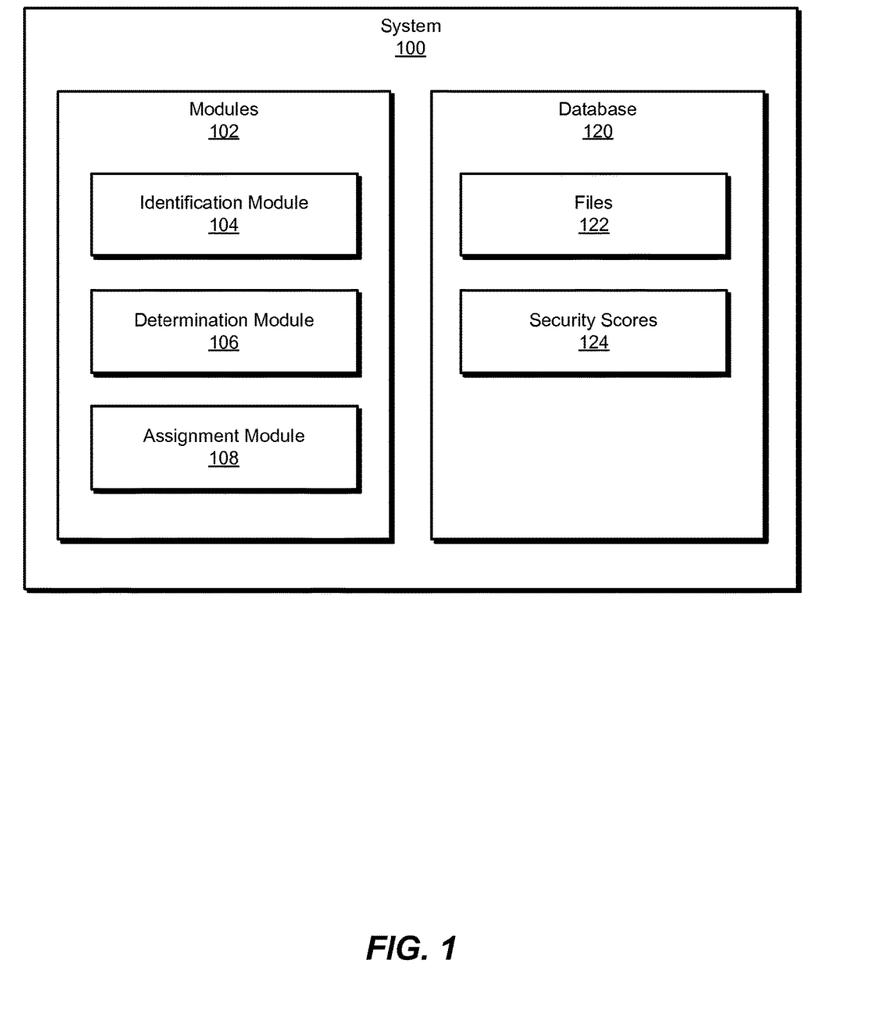
FIG. 1 is a block diagram of an exemplary system for file classification.
Figure 2:
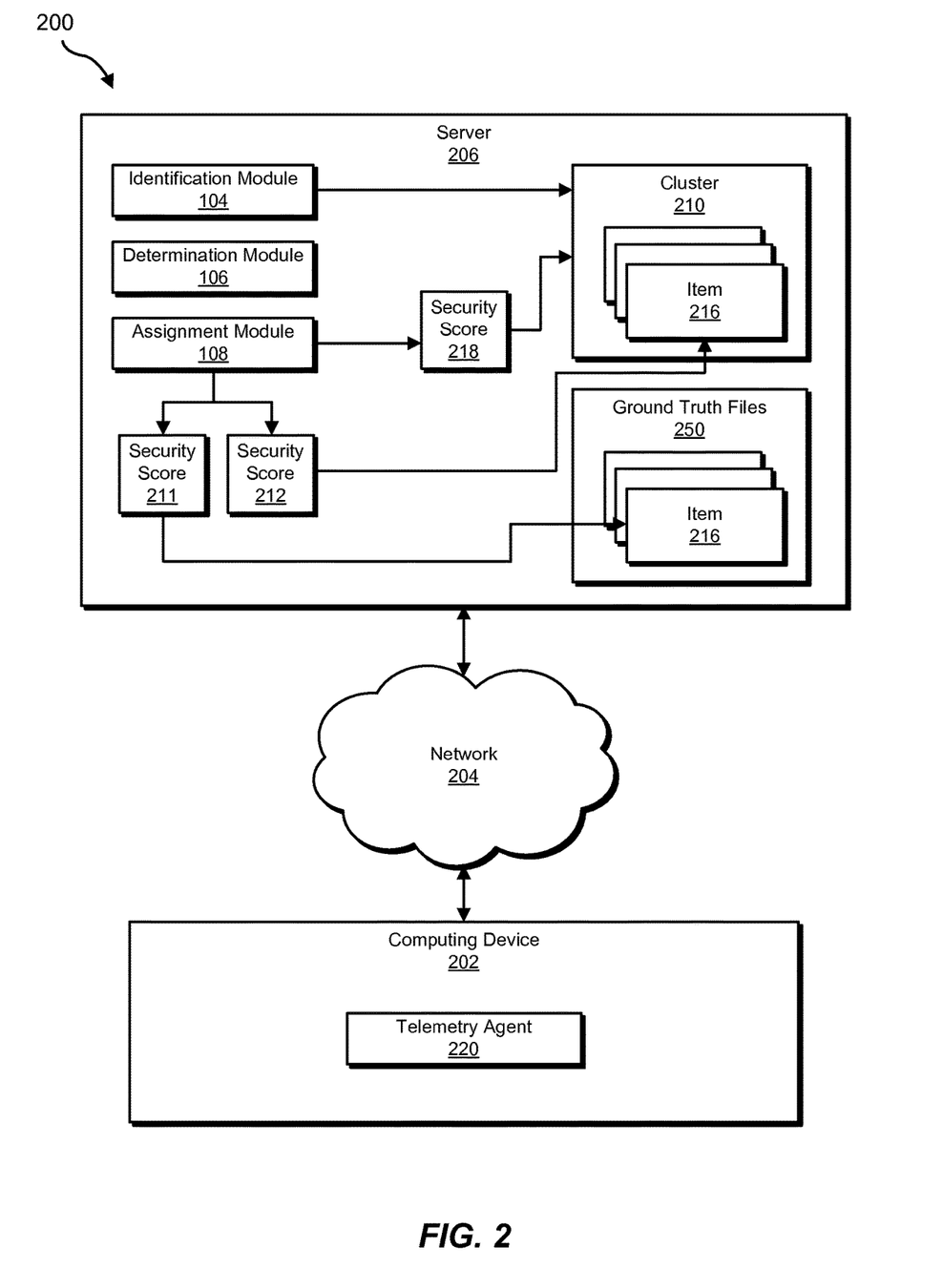
FIG. 2 is a block diagram of an additional exemplary system for file classification.

The following will provide, with reference to FIGS. 1-2, detailed descriptions of exemplary systems for file classification. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for file classification. As illustrated in this figure, exemplary system 100 may include one or more modules 102 for performing one or more tasks. For example, and as will be explained in greater detail below, exemplary system 100 may also include an identification module 104 that identifies, as part of a computer security system, a cluster of files that co-occur with each other according to a statistical analysis. Identification module 104 may also identify ground truth files to which the computer security system has previously assigned a security score. Exemplary system 100 may additionally include a determination module 106 that determines that a file in the cluster of files shares an item of file metadata with at least one other file in the ground truth files. Exemplary system 100 may further include an assignment module 108 that assigns a security score to the file in the cluster of files based at least in part on a security score of the other file in the ground truth files that shares the item of file metadata. Assignment module 108 may assign an overall security score to the entire cluster of files based at least in part on the security score assigned to the file in the cluster. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may include one or more databases, such as database 120. As will be discussed further below, database 120 may be configured to store files 122, which may include both files under evaluation by a security software product as well as ground truth files that indicate a known classification as either safe or malicious, as discussed further below. In another example, database 120 may also be configured to store security scores 124, which may indicate the classifications of the ground truth files.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to classify files. For example, and as will be described in greater detail below, identification module 104 may identify, as part of a computer security system (e.g., system 200), a cluster 210 of files that co-occur with each other according to a statistical analysis. Identification module 104 may also identify ground truth files 250 to which the computer security system has previously assigned a security score. Determination module 106 may determine that a file in cluster 210 shares an item 216 of file metadata with another file in ground truth files 250. Assignment module 108 may assign a security score 212 to the file in cluster 210 of files based on a security score 211 of the other file in ground truth files 250 that shares item 216 of file metadata. Additionally or alternatively, assignment module 108 may assign an overall security score 218 to the entire cluster 210 based on security score 212 assigned to the file in cluster 210. Notably, system 200 may also include a telemetry agent 220, as discussed further below.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of facilitating the classification of files for security purposes. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
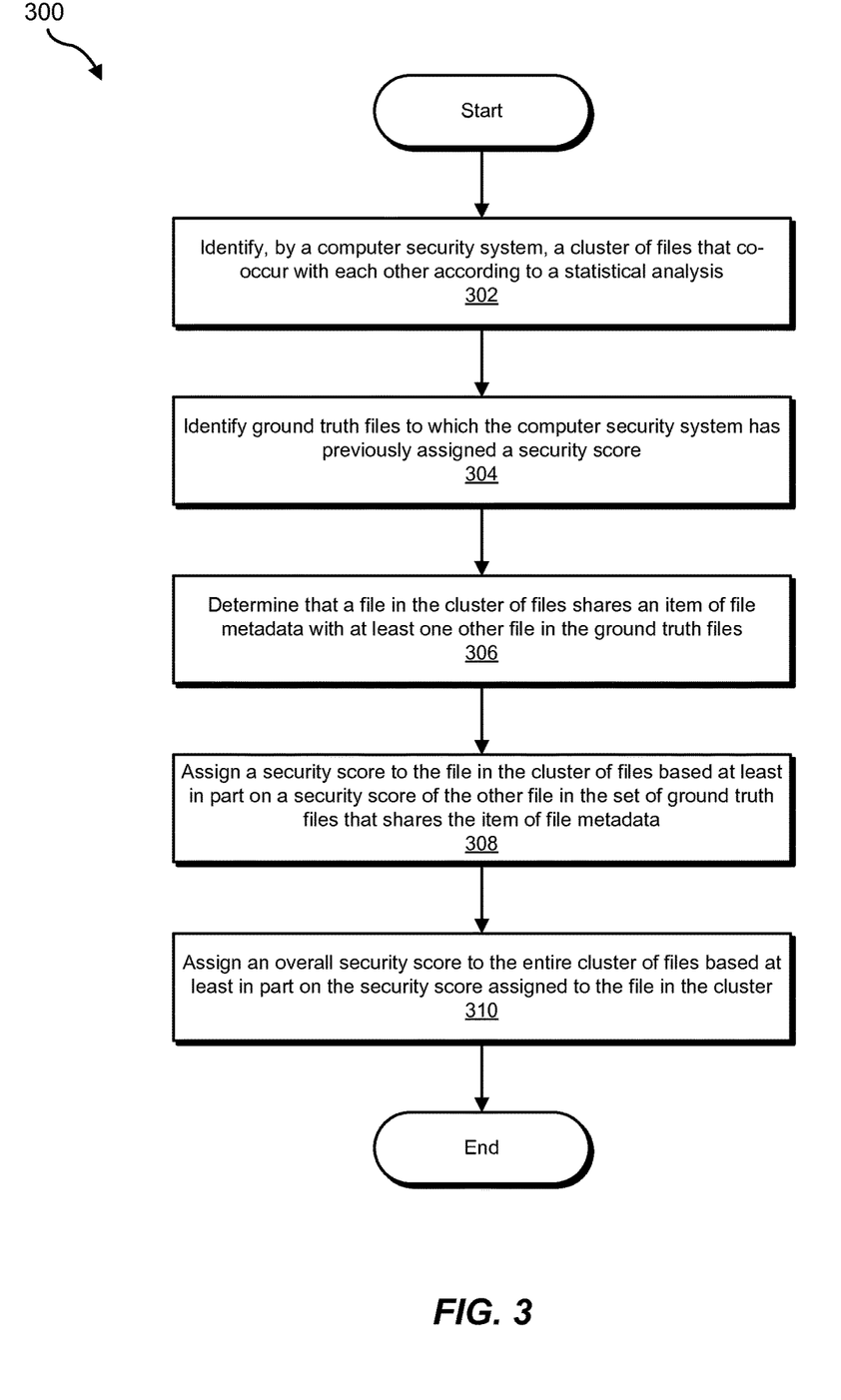
FIG. 3 is a flow diagram of an exemplary method for file classification.

FIG. 3 is a flow diagram of an exemplary computer-implemented method 300 for file classification. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify a cluster of files that co-occur with each other according to a statistical analysis. For example, identification module 104 may, as part of server 206 in FIG. 2, identify cluster 210 of files that co-occur with each other according to a statistical analysis.

As used herein, the term "cluster of files" generally refers to files that a statistical analysis shows co-occur together or tend to be located at the same location or computing system as each other. Typically, the cluster of files indicates files associated with a single application or installation. Moreover, as used herein, the term "statistical analysis" generally refers to any analysis of statistics and/or probability that distinguishes between files that co-occur and those that do not (e.g., according to a threshold of co-occurrence).

Identification module 104 may identify the cluster of files in a variety of ways. In general, identification module 104 may identify the cluster of files in any of the ways described in the earlier U.S. patent application Ser. No. 14/273,503, which is incorporated by reference in its entirety. Identification module 104 may also identify the cluster of files using any other suitable technique. For example, identification module 104 may identify, as subsets within one or more data sets, all recorded instances of (1) a first file, (2) a second file, and/or (3) either the first file or the second file. Identification module 104 may then calculate a proportion of one or more of these subsets in which both the first file and the second file co-occur (e.g., were detected or recorded on the same location, premise, computing environment, machine, and/or network, etc., according to one or more proximity metrics). Moreover, identification module 104 may determine whether the calculated proportion satisfies or exceeds a predetermined or user-defined threshold beyond which the computer security system may classify the files as co-occurring. Notably, the statistical analysis of co-occurrence will generally detect all instances of application packages that install multiple files associated with the application on a single machine.

At step 304, one or more of the systems described herein may identify ground truth files to which the computer security system has previously assigned a security score. For example, identification module 104 may, as part of server 206 in FIG. 2, identify ground truth files 250 to which the computer security system has previously assigned a security score.

As used herein, the term "ground truth files" generally refers to any files that the computer security system has previously assigned a security score, such as safe or malicious, and stored for future reference. The computer security system may reference the ground truth files to identify other copies of the files as safe or malicious. The computer security system may also compare attributes or metadata of the ground truth files with other unknown or suspicious files to make educated estimates of security scores for the unknown or suspicious files.

Moreover, as used herein, the term "security score" generally refers to any score or measurement of estimated or known safety or maliciousness from the perspective of computer security. For example, the security score may include a discreet classification, such as safe, malicious, or unknown. Additionally, or alternatively, the security score may include a granular score such as a numerical value along a discrete or continuous scale (e.g., 6.0 on a ten point scale from 0.0 as safe to 10.0 as malicious). In one exemplary embodiment, a score of −1 may indicate maliciousness and a score of +1 may indicate that the file is benign.

Identification module 104 may identify ground truth files 250 in a variety of ways. In general, a backend security server of a security vendor may collect files and corresponding information about the files from one or more sources in the field. For example, the backend security server, such as server 206, may receive reports from telemetry agent 220 in FIG. 2. Upon detecting a file using any suitable mechanism, the backend security server and/or human experts may analyze the file in an attempt to classify the file or make an educated estimation of a security score for the file. Whenever these attempts to classify the file succeed, the backend security server may store a record of the file (e.g., a hash of the file) together with the determined classification or security score as a ground truth file within a security database, such as database 120.

At step 306, one or more of the systems described herein may determine that a file in the cluster of files shares an item of file metadata with at least one other file in the ground truth files. For example, determination module 106 may, as part of server 206 in FIG. 2, determine that a file in cluster 210 of files shares item 216 of file metadata with at least one other file in ground truth files 250.

As used herein, the term "file metadata" generally refers to any attribute about the file that the computer security system may leverage to make educated estimates of security scores for other files that share the attribute or otherwise resemble the original file. Examples of file metadata may include the file name, the file path (e.g., a normalized file path), header information (e.g., fields or values within the file header), file system or operating system metadata for the file (e.g., a last modified date), a size of the file, a measure of information complexity for the file, a digital signature and/or corresponding author or owner of the digital signature in the case that the file is digitally signed, and/or aspects or structures of binary code that constitutes the file or is associated with the file.

In a variety of ways, determination module 106 may determine that the file in the cluster shares the item of file metadata with the other file in ground truth files 250. For example, database 120 may record values for fields of file metadata of ground truth files 250 such that the backend security server may locate ground truth files sharing the metadata value as a database key in a search. In some examples, the search of database 120 for a specific value of a field of file metadata may return numerous matches among the ground truth files. As one specific example, a search for the file name "installer.exe" may return dozens of instances of matches within database 120. In further examples, determination module 106 may be configured to catalog, strip, and/or identify a predetermined number of items of file metadata for any file detected by the corresponding security software product and then submit those items of file metadata to server 206 to identify matches (e.g., in an automated and/or batch mode). Determination module 106 may also determine that the two files share the item of file metadata using any other suitable algorithm or technique.

In some examples, determination module 106 may, prior to determining that the file in the cluster shares the item of file metadata with the other file, check a field of file metadata that corresponds to the item of file metadata for accuracy in detecting security threats. For example, determination module 106 may check the field of file metadata (such as the field of the file name, file path, and/or digital signature) by checking for a threshold amount of false negatives and/or a threshold amount of false positives. More specifically, determination module 106 may perform these checks by executing one or more of the techniques herein for classifying files (e.g., according to method 300) in situations where cluster 210 is also a part of ground truth files 250. In these embodiments, determination module 106 may ignore the previously-identified or known classifications while performing (e.g., in cooperation with modules 102) method 300 to classify the files. After classifying the files, determination module 106 may check the new classifications against the previously-identified or known classifications recorded within ground truth files 250. Upon checking the new classifications against the previously-identified classifications, determination module 106 may thereby identify errors, including false positives and false negatives.

Upon identifying false negatives and/or false positives, system 200 may bias the use of the corresponding field of file metadata based on the amount or proportion of errors. For example, determination module 106 may increase or decrease a weight assigned to the field of file metadata based on the detected amount or proportion of errors (e.g., proportionally increasing the weight when there are fewer errors and decreasing the weight when there are more errors). Notably, determination module 106 may measure errors along one or more dimensions, including the number of false positives, the number of false negatives, the ratio of true positives/false negatives, and/or the ratio of true negatives/false positives, or any other permutation or suitable ratio of these values or other error measurement. Moreover, determination module 106 may also exclude one or more fields of file metadata from method 300 based on a determination that one or more of these calculated values or ratios satisfies or exceeds a predetermined or user-defined threshold beyond which the vendor considers the level of error to be too great (e.g., adjusts the weight to zero). Upon checking the field of file metadata for accuracy, determination module 106 may also determine that the field of file metadata either passes or fails the check, as further discussed above.

Similarly, in one embodiment, determination module 106 may determine, prior to determining that the file in the cluster of files shares the item of file metadata with the other file, a ranking, in terms of detection accuracy, of a field of file metadata that corresponds to the item of file metadata in comparison to other fields of file metadata. In other words, determination module 106 may rank one or more fields of file metadata along any one or more of the dimensions discussed above in terms of accuracy (e.g., false positives, false negatives, and/or corresponding ratios). In these examples, system 200 may only use one or more of the top ranking fields of file metadata when performing method 300 while excluding a remainder the lower ranking fields of file metadata. Moreover, system 200 may assign weights to fields of file metadata in accordance with, or in proportion to, the ranking such that higher ranked fields of file metadata are given more weight when determining similarity and corresponding safety or maliciousness between two files.

Notably, in alternative embodiments, determination module 106 may determine that the two files do not share the exact same item of file metadata but that the two corresponding values for the field of the file metadata nevertheless satisfy a similarity threshold. For example, determination module 106 may compare two values for a field of file metadata according to one or more similarity algorithms that measure an alphanumeric and/or mathematical degree of similarity between the two. Determination module 106 may further compare the resulting calculated degree of similarity against a threshold to determine whether the two values satisfy the similarity threshold. Accordingly, system 200 may use the field of file metadata for these two similar values in a manner parallel to the manner in which system 200 uses the exact same values, as discussed above.

At step 308, one or more of the systems described herein may assign a security score to the file in the cluster of files based at least in part on a security score of the other file in the ground truth files that shares the item of file metadata. For example, assignment module 108 may, as part of server 206 in FIG. 2, assign security score 212 to the file in cluster 210 of files based at least in part on security score 211 of the other file in ground truth files 250 that shares item 216 of file metadata.

Assignment module 108 may assign the security score to the file in cluster 210 in a variety of ways. Notably, assignment module 108 may assign the security score in the case where system 200 has not previously assigned any security score to any file (or some files, such as a sufficiently small fraction of files according to a threshold) within the cluster. Accordingly, without leveraging the file metadata shared with files in the ground truth files, system 200 may be unable in these situations to easily or conveniently apply information from the ground truth files to the new and unknown files in the cluster.

In some examples, assignment module 108 may assign the security score to the file in cluster 210 by simply propagating or copying the security score from the file in ground truth files 250 to the file in the cluster. In other examples, assignment module 108 may assign the security score by adjusting, or weighting, the security score of the ground truth file in proportion to a degree to which (1) the two files resemble each other, (2) two values for the field of file metadata resemble each other, and/or (3) the field of file metadata is calculated to be accurate or inaccurate, as discussed further above.

In further examples, assignment module 108 may assign the security score to the file based on multiple files in ground truth files 250 that share the item of metadata. In these examples, not all of the multiple files in ground truth files 250 may share the same security score. Accordingly, assignment module 108 may institute a voting scheme in which each of the security scores of the files in the matching ground truth files contributes a vote on which security score should be assigned to the file in the cluster. For example, if 75% of the files in the ground truth files that share the item of metadata have a security score of malicious, then assignment module 108 may assign the file in the cluster a security score malicious.

Figure 4:
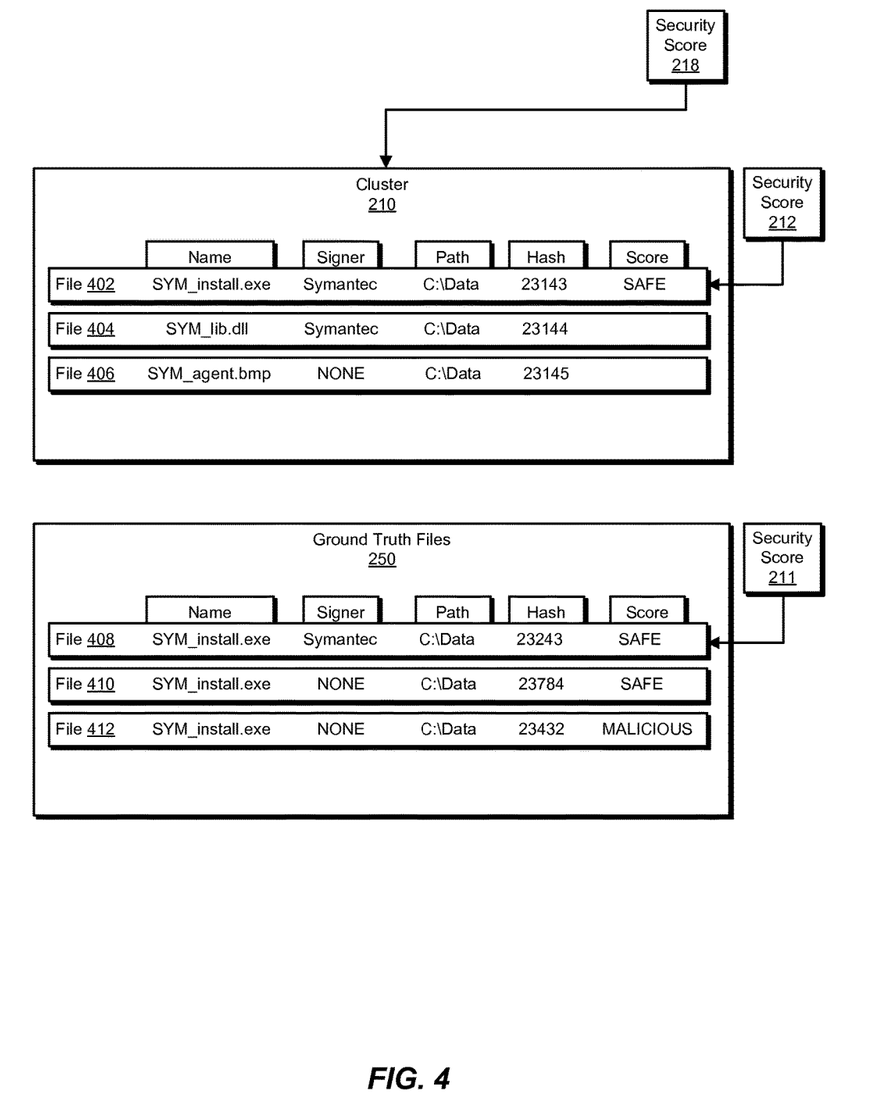
FIG. 4 is a block diagram of exemplary files that illustrate an exemplary method for file classification.

FIG. 4 shows a block diagram with more detail of an example of cluster 210 and ground truth files 250. In this example, a file 402, among another file 404 and a file 406 in cluster 210, may be under evaluation. Accordingly, assignment module 108 may consult ground truth files 250 and discover that file 402 shares a file name with a file 408, a file 410, and a file 412. Assignment module 108 may further discover that two of these three files have ground truth values of safe. Accordingly, assignment module 108 may assign file 402 a score of "safe" based on a majority vote. Assignment module 108 may alternatively use any other suitable voting scheme other than majority vote, as discussed further below.

In general, assignment module 108 may use any suitable algorithm, formula, weighted or unweighted algebraic equation or business logic that outputs the security score for the file in the cluster based on a multitude of security scores previously assigned to ground truth files that share the item of metadata. Moreover, assignment module 108 may apply voting schemes to assign security score 212 to the file in a manner parallel to the manner in which assignment module 108 may apply voting schemes or other techniques to assign security score 218, as discussed further below for step 310.

At step 310, one or more of the systems described herein may assign an overall security score to the entire cluster of files based at least in part on the security score assigned to the file in the cluster. For example, assignment module 108 may, as part of server 206 in FIG. 2, assign an overall security score 218 to the entire cluster 210 of files based at least in part on security score 212 assigned to the file in cluster 210.

As used herein, the term "overall security score" generally refers to any security score (e.g., an original security score or a modification or revision of a previous security score) assigned to the entire cluster files that is separate and distinct from security score 212 assigned to the file. In general, the overall security score may be a specific value assigned to the entire cluster files as a whole or, instead, may represent one or more security scores that are assigned to underlying files within the cluster of files (e.g., other than the file having security score 212) based at least in part on security score 212. For example, the computer security system may propagate a classification of "malicious" for the file having security score 212 to the cluster containing the file or to a remainder of files within the cluster.

Assignment module 108 may assign the overall security score in a variety of ways. In some examples, assignment module 108 may assign overall security score 218 to the entire cluster 210 of files by applying a machine learning model that is generated by inputting to a machine learning algorithm (1) known security scores from a set of files in the ground truth files (2) items of metadata that the set of files shares with another set of files in the ground truth files. The machine learning algorithm may thereby develop or formulate a weak classifier, or other classification scheme, that maps items of metadata to corresponding security scores. Similarly, the machine learning algorithm may appropriately weight, emphasize, and/or deemphasize any one or more of the items of file metadata (or fields of file metadata) based on a determination of how accurate and/or informative they are at classifying files. Notably, the machine learning algorithm may leverage the fact that files in ground truth files 250 have previously-identified classifications, which system 200 may use to train the corresponding machine learning model.

In further examples, assignment module 108 may assign an overall security score to the entire cluster of files by giving the file a vote in a vote on the overall security score for the entire cluster of files. Accordingly, classifications of malicious for files within the cluster may count as votes to classify the entire cluster as malicious. Assignment module 108 may use any suitable voting scheme, including a majority vote where the threshold is 50% of the votes or another voting scheme that uses a lower threshold. For example, assignment module 108 may error on the side of caution by lowering the threshold to 10%, 20%, 30%, 40%, or another suitably low threshold that reflects the sensitivity of the computer security system to indications of malicious files. As another example, assignment module 108 may assign the cluster a security score of malicious based on a single file within the cluster being assigned a security score of malicious.

As explained above, the systems and methods described herein may enable security software products to overcome limitations in properly classifying files after the security software products have identified clustering or co-occurring relationships between the files. In other words, a security software product may identify a cluster of co-occurring files. Accordingly, the vendor of the security software product would like to leverage a classification of one of the files to thereby classify the remainder of the files in the cluster because all the files in the cluster will likely share the same classification. Nevertheless, the vendor of the security software product may be unable to leverage the classification of one of the files if the vendor has not previously encountered or classified a single file within the cluster. Accordingly, the systems and methods described herein may overcome this limitation by further leveraging security scores that the vendor previously assigned to files that (1) are different than the files in the cluster under evaluation but nevertheless (2) share attributes of file metadata with the files in the cluster. Because these different files nevertheless share attributes of file metadata, the security software product may safely estimate that the different files share a common security classification.

Figure 5:
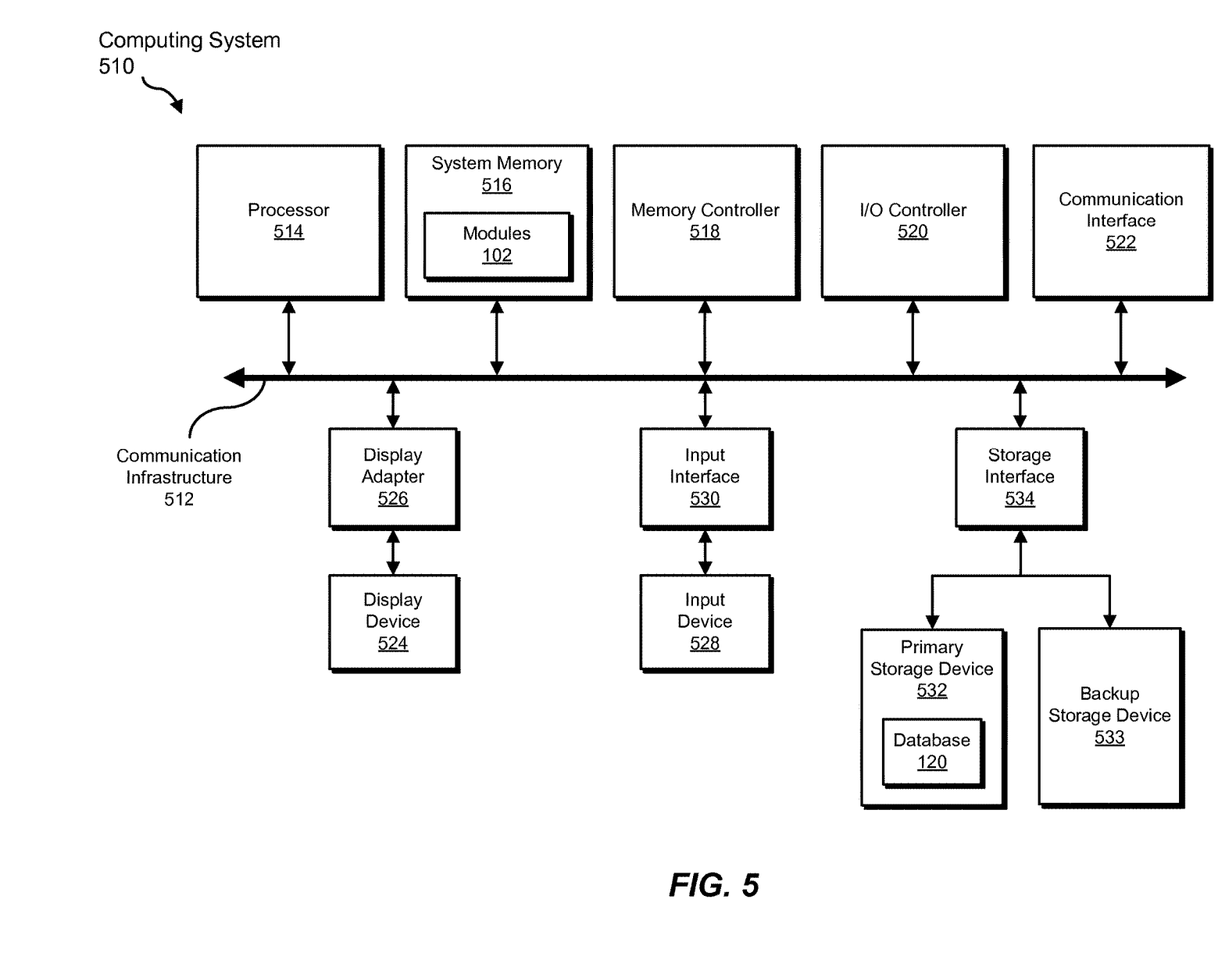
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
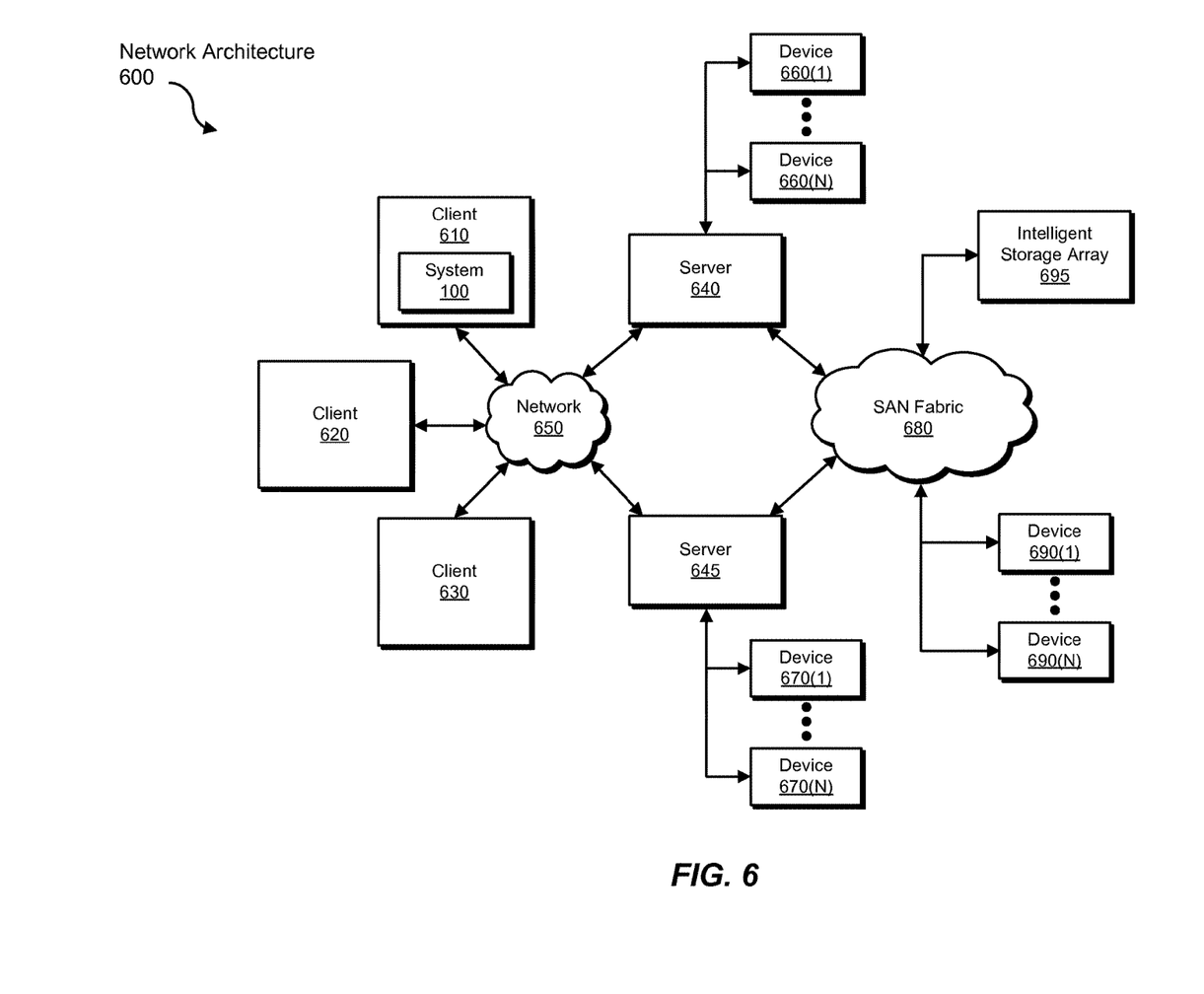
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for file classification.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive unknown or suspicious files to be classified, transform the files and/or their classifications, output a result of the transformation to a display and/or another output device, use the result of the transformation to protect users from malicious files, and store the result of the transformation to storage or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for file classification, at least a portion of the method being performed by a computing device comprising at least one processor, the method comprising:
    identifying, by a computer security system, a cluster of files that co-occur with each other according to a statistical analysis that detects instances of application packages that install multiple files associated with an application on a single machine;
    identifying ground truth files to which the computer security system has previously assigned a security score;
    determining that a file in the cluster of files shares an item of file metadata with at least one other file in the ground truth files;
    assigning a security score to the file in the cluster of files based at least in part on a security score of the other file in the ground truth files that shares the item of file metadata;
    assigning an overall security score to the entire cluster of files based at least in part on the security score assigned to the file in the cluster;
    checking, prior to determining that the file in the cluster of files shares the item of file metadata with the other file, a field of file metadata that corresponds to the item of file metadata for accuracy in detecting security threats by checking for a threshold level of at least one of false positives and false negatives; and
    determining that the field of file metadata passes the checking for accuracy.

2. The method of claim 1, wherein the item of file metadata comprises at least one of:
    an identity of an author of a digital signature;
    a file name; and
    a file path.

3. The method of claim 1, wherein prior to assigning the security score to the file, the computer security system has not previously assigned a security score to any file in the cluster of files.

4. The method of claim 1, wherein assigning the overall security score to the entire cluster of files comprises giving the file a vote in a vote on the overall security score for the entire cluster of files.

5. The method of claim 1,
    wherein the threshold level comprises a threshold level of false positives.

6. The method of
    claim 1, wherein the threshold level comprises a threshold level of false negatives.

7. The method of claim 1, further comprising determining, prior to determining that the file in the cluster of files shares the item of file metadata with the other file, a ranking, in terms of detection accuracy, of the field of file metadata that corresponds to the item of file metadata in comparison to other fields of file metadata.

8. The method of claim 1, wherein assigning the overall security score to the entire cluster of files comprises applying a machine learning model that is generated by inputting to a machine learning algorithm:

known security scores from a set of files in the ground truth files; and items of file metadata that the set of files shares with another set of files in the ground truth files.

9. The method of claim 1, wherein assigning the security score to the file in the cluster of files comprises:

identifying a plurality of files in the ground truth files that share the item of file metadata with the file in the cluster; and assigning the security score to the file based on security scores assigned to the plurality of files in the ground truth files.

10. The method of claim 1, wherein the security score comprises a classification as malicious.

11. A system for file classification, the system comprising:

an identification module, stored in memory, that:

identifies a cluster of files that co-occur with each other according to a statistical analysis that detects instances of application packages that install multiple files associated with an application on a single machine; and identifies ground truth files to which the system has previously assigned a security score;

a determination module, stored in memory, that determines that a file in the cluster of files shares an item of file metadata with at least one other file in the ground truth files;

an assignment module, stored in memory, that:

assigns a security score to the file in the cluster of files based at least in part on a security score of the other file in the ground truth files that shares the item of file metadata; and assigns an overall security score to the entire cluster of files based at least in part on the security score assigned to the file in the cluster;

wherein the determination module further:

checks, prior to determining that the file in the cluster of files shares the item of file metadata with the other file, a field of file metadata that corresponds to the item of file metadata for accuracy in detecting security threats by checking for a threshold level of at least one of false positives and false negatives; and determines that the field of file metadata passes the checking for accuracy; and at least one physical processor configured to execute the identification module, the determination module, and the assignment module.

12. The system of claim 11, wherein the item of file metadata comprises at least one of:

an identity of an author of a digital signature;

a file name; and a file path.

13. The system of claim 11, wherein prior to assigning the security score to the file, the system has not previously assigned a security score to any file in the cluster of files.

14. The system of claim 11, wherein the assignment module assigns the overall security score to the entire cluster of files by giving the file a vote in a vote on the overall security score for the entire cluster of files.

15. The system of claim 11, wherein the threshold level comprises a threshold level of false positives.

16. The system of claim 11, wherein the threshold level comprises a threshold level of false negatives.

17. The system of claim 11, wherein the determination module determines, prior to determining that the file in the cluster of files shares the item of file metadata with the other file, a ranking, in terms of detection accuracy, of the field of file metadata that corresponds to the item of file metadata in comparison to other fields of file metadata.

18. The system of claim 11, wherein the assignment module assigns the overall security score to the entire cluster of files by applying a machine learning model that is generated by inputting to a machine learning algorithm:

known security scores from a set of files in the ground truth files; and items of file metadata that the set of files shares with another set of files in the ground truth files.

19. The system of claim 11, wherein the assignment module assigns the security score to the file in the cluster of files by:

identifying a plurality of files in the ground truth files that share the item of file metadata with the file in the cluster; and assigning the security score to the file based on security scores assigned to the plurality of files in the ground truth files.

20. A non-transitory computer-readable medium comprising one or more computer-readable instructions that, when executed by at least one processor of a computing device, cause the computing device to:

identify, by a computer security system, a cluster of files that co-occur with each other according to a statistical analysis that detects instances of application packages that install multiple files associated with an application on a single machine;

identify ground truth files to which the computer security system has previously assigned a security score;

determine that a file in the cluster of files shares an item of file metadata with at least one other file in the ground truth files;

assign a security score to the file in the cluster of files based at least in part on a security score of the other file in the ground truth files that shares the item of file metadata;

assign an overall security score to the entire cluster of files based at least in part on the security score assigned to the file in the cluster;

check, prior to determining that the file in the cluster of files shares the item of file metadata with the other file, a field of file metadata that corresponds to the item of file metadata for accuracy in detecting security threats by checking for a threshold level of at least one of false positives and false negatives; and determine that the field of file metadata passes the checking for accuracy.

* * * * *